US012698825B2

(12) United States Patent
Suess et al.

(10) Patent No.: US 12,698,825 B2
(45) Date of Patent: Aug. 4, 2026

(54) GEAR HAVING A HELICAL TOOTHING

(71) Applicant: IMS GEAR SE & CO. KGAA,
Donaueschingen (DE)

(72) Inventors: Marius Suess, Blumberg (DE);
Sebastian Birk, Trossingen (DE);
Michael Knoepfle, Huefingen (DE);
Paul Schachtschneider,
Villingen-Schwenningen (DE); **Eugen
Stoppel**, Muehlingen (DE)

(73) Assignee: IMS GEAR SE & CO. KGAA,
Donaueschingen (DE)

( * ) Notice: Subject to any disclaimer, the term of this
patent is extended or adjusted under 35
U.S.C. 154(b) by 0 days.

(21) Appl. No.: 19/100,874

(22) PCT Filed: Aug. 8, 2023

(86) PCT No.: PCT/EP2023/071970
§ 371 (c)(1),
(2) Date: Feb. 3, 2025

(87) PCT Pub. No.: WO2024/033380
PCT Pub. Date: Feb. 15, 2024

(65) Prior Publication Data
US 2026/0036193 A1      Feb. 5, 2026

(30) Foreign Application Priority Data

Aug. 9, 2022     (EP) ..................................... 22189554

(51) Int. Cl.
*F16H 55/08*          (2006.01)
*F16H 1/08*           (2006.01)
(Continued)

(52) U.S. Cl.
CPC ............. *F16H 55/082* (2013.01); *F16H 1/08*
(2013.01); *F16H 55/06* (2013.01); *F16H
55/17* (2013.01); *F16H 2055/065* (2013.01)

(58) Field of Classification Search
CPC ........ F16H 55/082; F16H 55/06; F16H 55/17;
F16H 2055/065
See application file for complete search history.

(56) References Cited

U.S. PATENT DOCUMENTS 6,230,578 B1 *   5/2001  Kim .................... F16H 55/0886
74/462
2019/0202322 A1 *  7/2019  Napau .................. B60N 2/0715
(Continued)

*Primary Examiner* — Terence Boes
(74) *Attorney, Agent, or Firm* — Nath, Goldberg &
Meyer; Jerald L. Meyer; Stanley N. Protigal

(57) ABSTRACT

The invention relates to a one-piece gear (1) made of plastic,
having
an axis of rotation (R),
external toothing (10) arranged about an axis of rotation,
a concentrically arranged receiving opening (40),
an intermediate portion (30) arranged between the exter-
nal toothing (10) and the receiving opening (40),
a reinforcing structure arranged in the intermediate por-
tion (30) having a plurality of openings (32, 33) and
reinforcing ribs (34, 35) disposed between the open-
ings, characterized by the following additional features:
the external toothing (10) is designed as a helical toothing
with a helix angle (W) to the axis of rotation (R),
at least some of the openings (32, 33) follow at least
approximately the helix angle (W) of the helical tooth-
ing with an opening angle (V).
The invention also relates to a method for producing such a
gear.

20 Claims, 6 Drawing Sheets

A-A

(51) Int. Cl.
  *F16H 55/06* (2006.01)
  *F16H 55/17* (2006.01)

(56) References Cited

U.S. PATENT DOCUMENTS

2022/0090669 A1* 3/2022 Taki ........................ F16H 55/06
2024/0035552 A1* 2/2024 Suess ..................... F16D 65/16

\* cited by examiner

Fig.8     A-A

Helix angle W on the pitch circle d_0

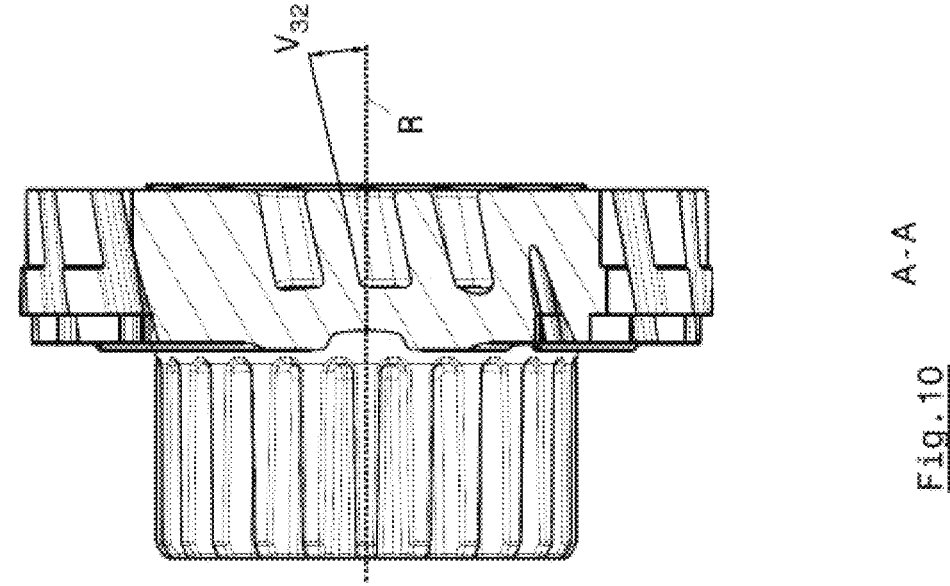
Fig.10    A-A
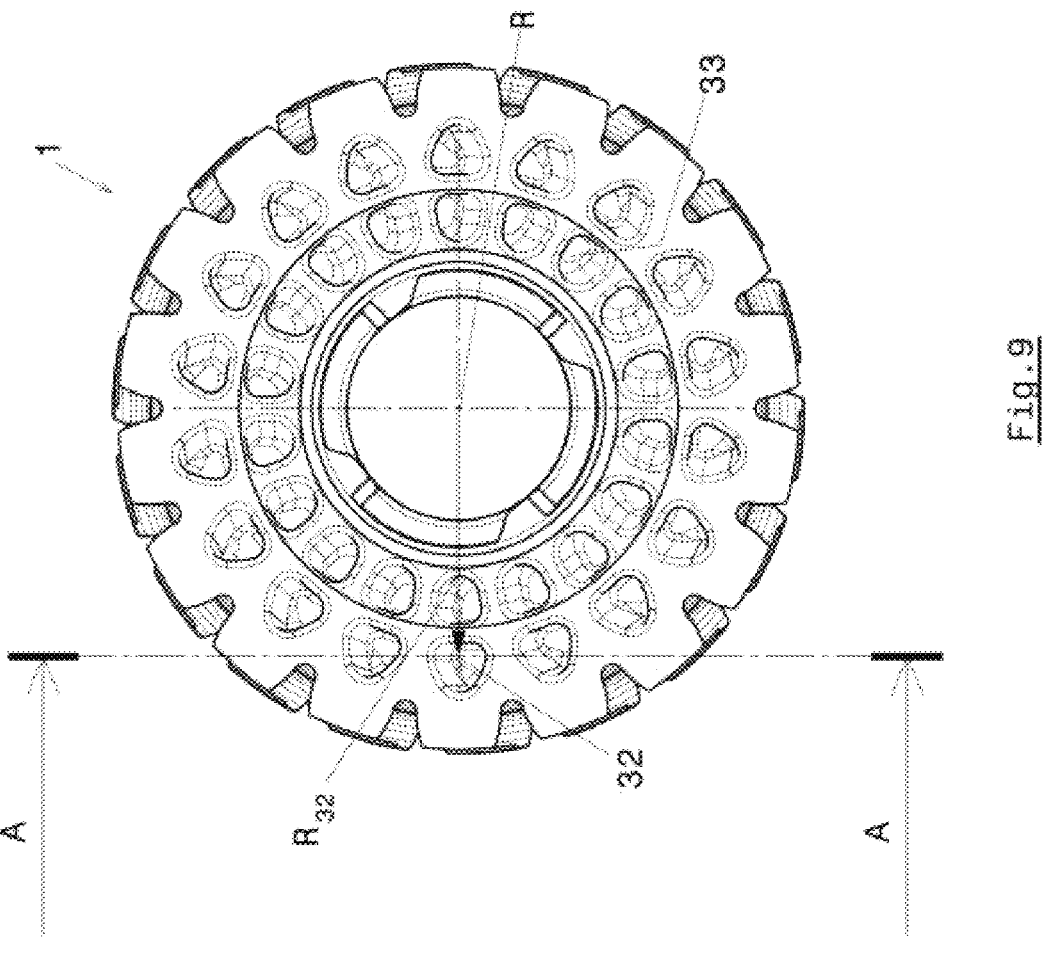
Fig.9

GEAR HAVING A HELICAL TOOTHING

CROSS-REFERENCE TO RELATED APPLICATIONS

This is a National Phase Application filed under 35 U.S.C. 371 as a national stage of PCT/EP2023/071970, filed Aug. 8, 2023, an application claiming the benefit of European Application No. 22189554.3 filed Aug. 9, 2022, the content of each of which is hereby incorporated by reference in its entirety.

FIELD

The invention relates to a one-piece gear made of plastic and relates to a method for producing said gear.

BACKGROUND

Examples of one-piece gears made of plastic are well known from DE 10 2017 201 383 A1, DE 202 22 502 U1, US2002/0029648 A1, and U.S. Pat. No. 6,070,484. The gears have external toothing arranged around a central axis of rotation. At its center, the gear has a receiving opening for receiving an axle or shaft, wherein an intermediate portion integrally connects said receiving opening to the external toothing. These known gears have what is known as spur toothing, i.e., the teeth of the external toothing are oriented parallel to the axis of rotation of the gear. Spur toothing of this type is problematic in respect of its smooth running and noise.

Also known are what are referred to as multi-component gears composed of different materials, e.g., different plastics, and parts.

Gears of this type are increasingly being used, in particular, for applications in auxiliary drives of motor vehicles, such as electric steering systems, electric seat adjusters, and electromechanical brakes. It is essential that these gears meet high strength requirements, but at the same time are also small.

In automotive engineering in general, but also, in particular, in the realization of electromechanical brakes, electric steering systems, and electric seat adjustments, there is a need to produce motor vehicle components in a way that saves on weight and space. In addition, due to increasing cost pressure, there is a requirement to produce such components required for the vehicles as inexpensively as possible.

SUMMARY

This is where the present invention comes in.

The aim of the invention is to further develop the aforesaid one-piece plastic gears, in particular, for use in an auxiliary drive of a motor vehicle, such that the gears take up little space, can be produced inexpensively and additionally meet the necessary strength requirements. In addition, such a gear should be characterized by low noise and very smooth running.

This aim is achieved by a one-piece plastic gear external toothing arranged about an axis of rotation, with a concentrically arranged receiving opening and an intermediate portion arranged between the external toothing and the receiving opening.

The one-piece gear made of plastic according to the invention therefore has the following features:

an axis of rotation (R), external toothing arranged around an axis of rotation, a concentrically arranged receiving opening, an intermediate portion arranged between the external toothing and the receiving opening, a reinforcing structure arranged in the intermediate portion and having a plurality of openings and reinforcing ribs disposed between the openings, the external toothing is designed as a helical toothing with a helix angle W to the axis of rotation, at least some of the openings follow at least approximately the helix angle W of the helical toothing with an opening angle V.

Thanks to the helical toothing of the external toothing, such a gear is characterized by smoother running and lower noise compared to gears with spur toothing. Due to the openings, which are also arranged obliquely according to the invention, and the therefore obliquely formed rib structure in the intermediate portion of the gear, the gear has a high degree of strength.

Although, in principle, it is possible to produce such a gear, using 3-D printing, for example, such that the opening angle V of the openings corresponds precisely or at least fairly precisely to the helix angle W of the external toothing, a development of the invention provides that the opening angle V is selected to be smaller or somewhat smaller than the helix angle W. The invention provides, in particular, that the angle satisfies the following specification or at least approximately follows it:

$$V = \arctan\big(\tan(W) \times (R)/(d0/2)\big),$$

where d0/2=half the pitch diameter of the external toothing (10),

R=distance from a center of one of the openings (32; 33) to the axis of rotation (R).

To implement a gear according to the invention, it has proven to be expedient for the helix angle W to be greater than 0 degrees and less than 25 degrees, preferably approximately 10 degrees to 20 degrees, and, in particular, approximately 15 degrees.

Such a design of the opening angle also makes it possible to produce the gear according to the invention in a tool using a plastic injection molding process. Such a tool has a large number of pins which are placed at those points on the tool mold that will later form the openings of the gear. Such a tool is removed from the finished injection-molded gear mold by rotating it during demolding after the injection process for the gear.

Although, in principle, the openings can also project as through-openings through the entire axial length of the gear, one embodiment of the invention provides that the openings are designed as blind openings, that is, each has a bottom.

The openings can be arranged on one annulus in the intermediate portion between the external toothing and the concentrical receiving opening. However, it is also within the scope of the invention that the openings are arranged on two or more different annuli.

To increase the strength of the gear, a circumferential reinforcing ring is provided between two circularly arranged rings of openings.

If the openings are arranged on two or more annuli, the openings may be arranged radially aligned with one another or radially offset from one another.

In another development of the invention, it is provided that the openings are arranged such that one of the openings is arranged under each tooth root of a tooth of the external toothing. This opening then extends at least approximately to a root circle of the respective tooth of the external toothing. It is also possible for the opening to project beyond the root circle into the respective tooth.

It has proven to be expedient for the openings, when viewed in cross-section, to have a shape deviating from an annulus and, in particular, to be designed oval or approximately triangular in shape. The inner walls of the openings may also be designed to be twisted or coiled. This facilitates demolding of a tool when the gear is produced by injection molding in a tool mold.

The receiving opening in the gear is provided with a suitable structure for receiving a hub, shaft, or spindle. If the receiving opening is intended to receive a spindle, the receiving opening is preferably provided with spindle-nut toothing into which the spindle can be screwed. Such a spindle can, for example, actuate an actuating piston of an electric brake when the gear, which is part of a gear arrangement of an electric brake, is rotated.

In a particular embodiment of the invention, the gear, on one of its axial end faces, is provided with an extension for receiving a radial and axial bearing, such as a ball bearing. In this case, the extension can be formed as a circumferential ring having a large number of evenly distributed ribs which are directed radially outward, an outer diameter of the extension being smaller than an outer diameter of the external toothing. The ball bearing mentioned above can, for example, be slid onto the ribs in a clamping manner, provided that the ribs have an outer diameter that is selected to be somewhat larger than the receiving ring of the ball bearing.

If the gear has an extension on an axial end face, it is advisable to provide a circumferential, concave depression between the extension and the axial end face of the gear. Such a circumferential, concave depression reduces the shearing forces when the gear is loaded.

In another embodiment of the invention, the radially outwardly pointing end faces of the teeth of the gear, viewed in the axial direction of the gear, are designed in a stepped manner. The external toothing can in this case have one or more steps. Such a gradation of the outer end faces of the teeth, i.e., the tooth crest of the teeth, ensures an increase in the contact pattern of the gear.

It has proven to be useful to provide the tooth crest with two steps set back to the left and right of a central portion, so that a central step has the greatest radial distance from the axis of rotation and the two outer steps have a smaller radius. The outer steps of the gear may be designed to be narrower in the axial direction than the center step.

In a development of the invention, the teeth of the external toothing have, viewed in the axial direction, an edge-side toothing portion which transitions from the helical toothing with the helix angle W to a spur toothing with the helix angle 0. This measure allows stresses in the tooth root of the external toothing to be distributed over a larger area.

BRIEF DESCRIPTION OF THE DRAWINGS

Exemplary embodiments of gears according to the invention are explained in more detail below in connection with several figures. In the figures:

FIG. 8 shows a sectional view along section line A-A in FIG. 7;

FIG. 9 shows a view similar to that in FIG. 1, but with a section line A-A disposed along the center of an opening of the gear disposed on an outer annulus;

FIG. 10 shows a corresponding sectional view of FIG. 9;

DETAILED DESCRIPTION

In the following figures, unless otherwise stated, the same reference numbers refer to the same parts with the same meaning.

Figures 1, 2:
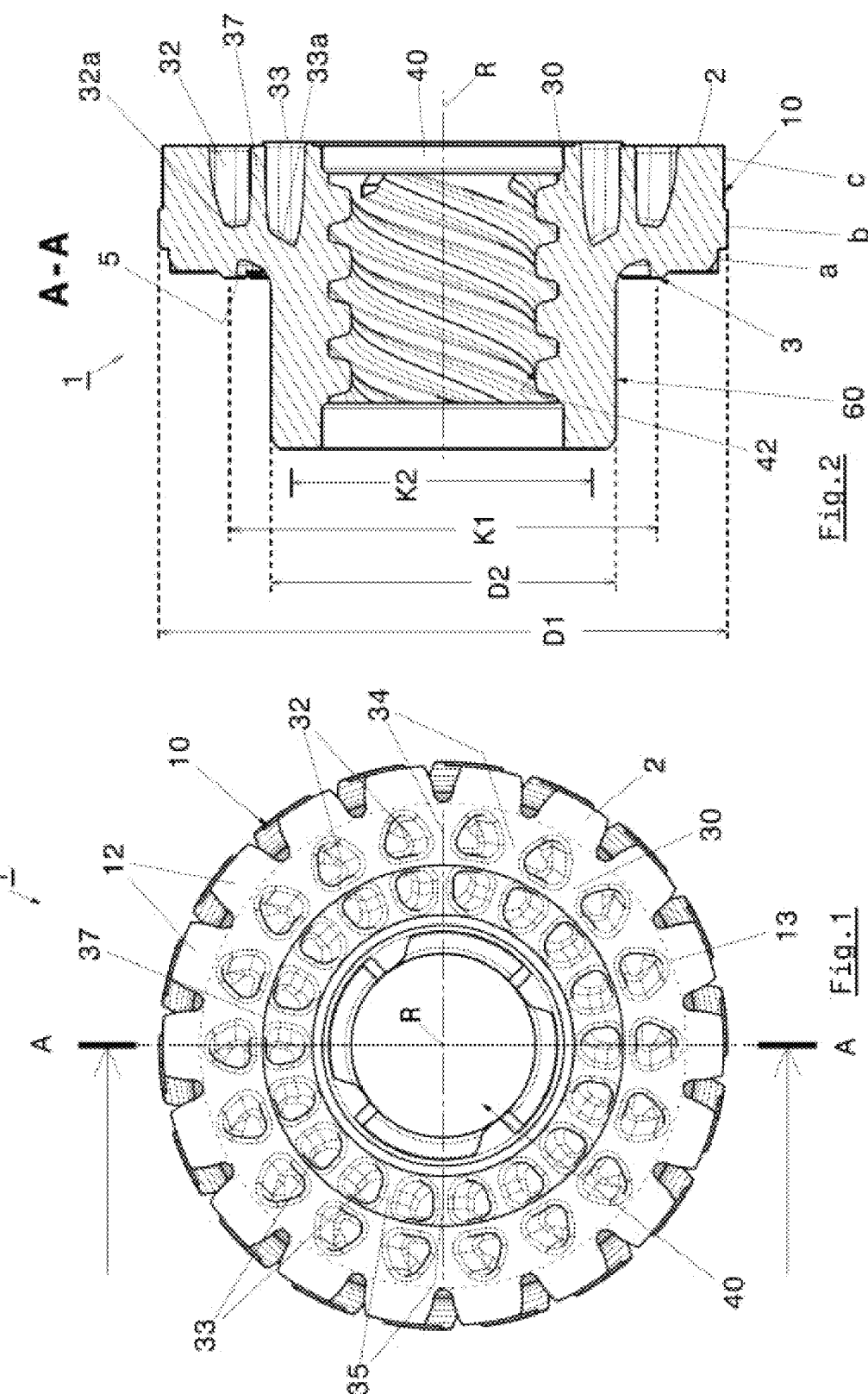
FIG. 1 shows a first exemplary embodiment of a gear according to the invention looking onto a front end face of the gear.
FIG. 2 shows a sectional view along section line A-A in FIG. 1.
Figure 7:
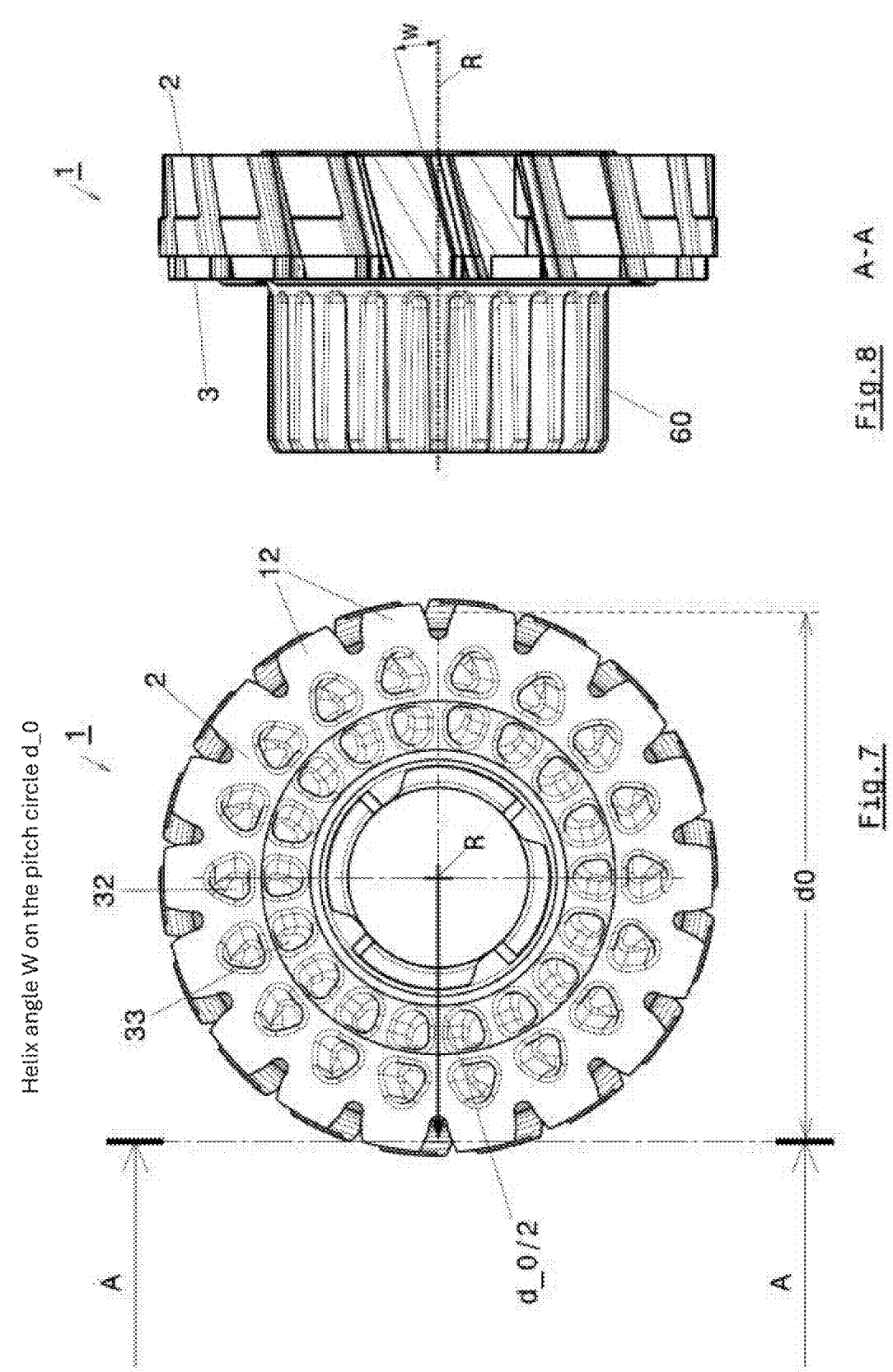
FIG. 7 shows a frontal plan view of the gear according to FIG. 1 with a section line A-A which is selected tangential to the pitch circle of the gear.

FIG. 1 shows a first exemplary embodiment of a gear 1 according to the invention with a view onto its first axial end face 2. The gear 1 has external toothing 10 having teeth 12 that are helically toothed at a helix angle W. Said helix angle W becomes clear in connection with FIGS. 7 and 8. FIG. 7 shows a representation similar to that in FIG. 1 with a section along a section line A-A, which is taken in the pitch circle of the external toothing 10 of the gear 1. The corresponding section A-A is shown in FIG. 8 and the helix angle W is marked. Said helix angle W is >0 and is, for example, about 15° in the exemplary embodiment of FIG. 8 shown. The helix angle can also be between about >0° and <25°, preferably between about 10° and 20°.

Returning to FIG. 1, the gear 1 has a central axis of rotation R. Concentrically to said axis of rotation R there is a receiving opening 40 for receiving a hub, a shaft, or the like. Disposed between said receiving opening 40 and the external toothing 10 is an intermediate portion 30 having a plurality of openings 32, 33, which are arranged in the intermediate portion 30 on two annuli. Disposed between the openings 32, 33, which are designed as blind openings in the present exemplary embodiment (see FIG. 2), are reinforcing ribs 34, 35 for increasing the strength of the entire gear 1. The openings are designed to be approximately triangular in shape when viewed in cross-section.

The external toothing 10 of the gear 1 has a plurality of circumferential teeth 12 which are arranged obliquely to the axis of rotation R according to the selected helical toothing. As can be seen from FIG. 1, the openings 32 disposed on an outer annulus in the intermediate portion 30 extend close to a root circle 13 of the external toothing 10. The openings 32, as well as the openings 33 arranged on the inner annulus, are placed radially in alignment with the tooth center of each tooth 12 of the external toothing.

An annular circumferential reinforcing ring 7 is disposed between the annularly arranged openings 32, 33.

As mentioned, the external toothing 10 of the gear 1 is designed as a helical toothing. At least some of the openings 32, 33 at least approximately follow said helix angle W of the helical toothing, namely with an opening angle V, which will be explained later. Thus, the openings and the wall portions of the associated openings 32, 33 are not arranged parallel to the axis of rotation R of the gear 1, but obliquely thereto, wherein the walls can additionally be twisted and coiled within themselves.

The entire gear 1 shown in FIG. 1 with its external toothing 10 and the intermediate portion 30 having the openings 32, 33 placed there and the reinforcing ribs 34 therebetween and the reinforcing ring 37 is formed in one piece and is made of plastic, in particular, using a suitable plastic injection molding process.

In the sectional view in FIG. 2, spindle nut toothing 42 provided on the inner wall of the receiving opening 40 can be seen along the section line A-A of FIG. 1. The spindle nut toothing 42 serves to receive a spindle such as those that can be screwed into electric brakes to actuate an actuating piston, for example. As can also be seen from FIG. 2, the gear 1 has a first axial end face 2, shown on the right in FIG. 2, and a second opposing axial end face 3, shown on the left in FIG. 2. On said second axial end face 3, an extension 60 projects from the second axial end face 3. The spindle nut toothing 42 in the opening 40 extends into said extension 60 in the interior of the gear 1, so that an extended receptacle for the spindle, not shown in FIG. 2, is achieved. An outer diameter D2 of the extension 60 is significantly smaller than an outer diameter D1 of the gear 1.

As can also be seen, the openings 32 disposed on an outer annulus are arranged on an annulus with the diameter K1 and the openings 33 arranged on the inner annulus are arranged on an inner annulus with the smaller diameter K2. Said openings 32, 33 are each designed in the form of blind openings and each have bottoms 32a, 33a.

Furthermore, FIG. 2 clearly shows that the radially outwardly pointing end faces of the teeth 12 of the external toothing 10 are stepped and, in the present example, have three step regions a, b, and c. The middle step region b is the one having the greatest diameter D1. To the left and right of said step region b are the step regions a and c, which are set slightly back from the step region b. Finally, in FIG. 2, a circumferential, concave depression 5 can also be seen between the extension 60 and the second axial end face 3. Said circumferential concave depression 5 ensures a reduction in the shearing forces when the gear 1 is loaded.

Figures 3, 4:
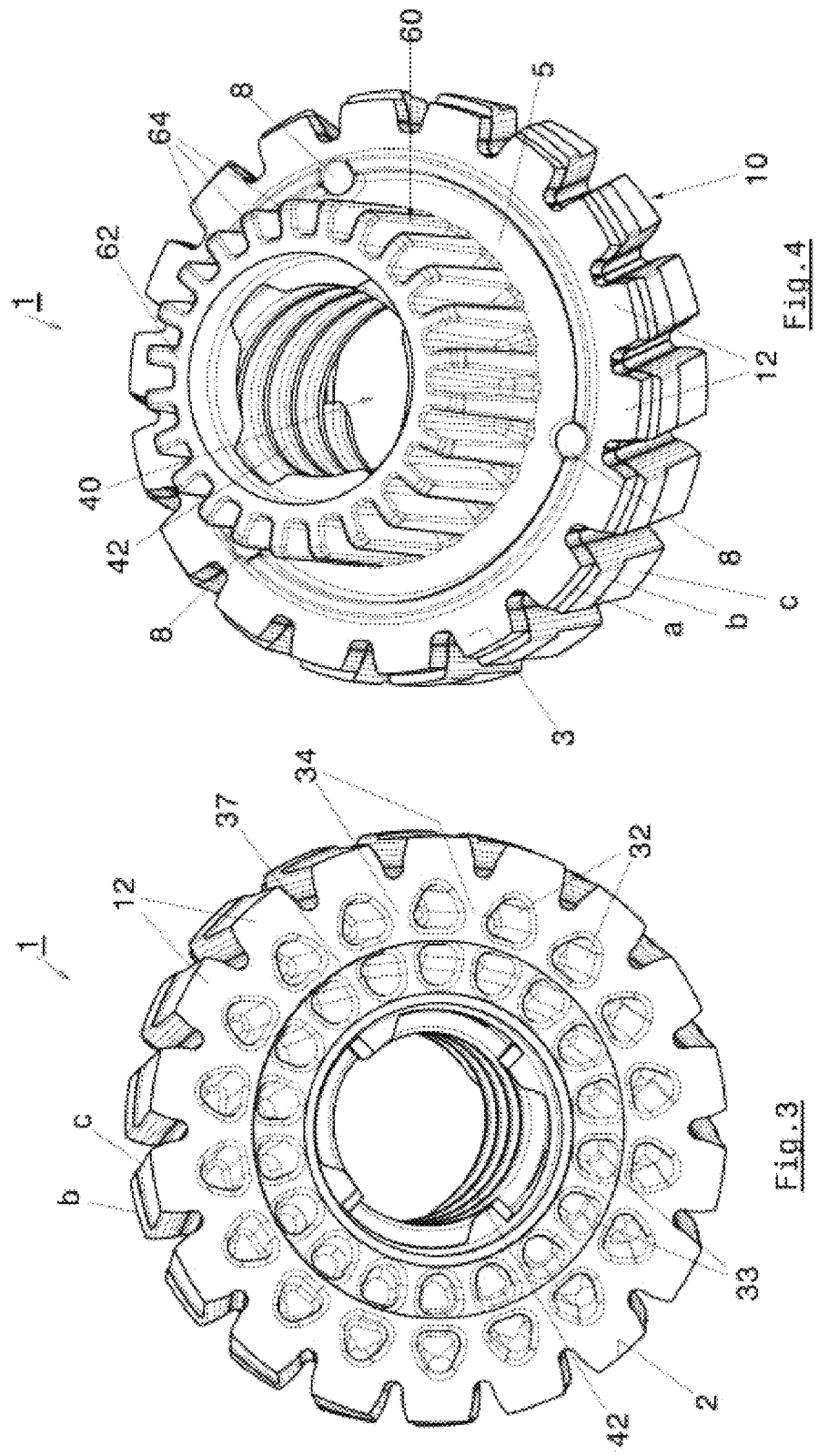
FIG. 3 shows a perspective view of the gear in FIG. 1 and FIG. 2 looking onto the front end face.
FIG. 4 shows a perspective view of the gear in FIG. 1 looking obliquely from behind onto the rear end face.

FIGS. 3 and 4 show the gear 1 in a perspective view looking onto the first end face 2 (FIG. 3) and looking onto the second, that is, rear, axial end face 3 of the gear 1 (FIG. 4). The reference numerals already known will continue to be used for the parts explained in connection with FIG. 1 and FIG. 2. As can be clearly seen, in particular from FIG. 4, three injection points 8, each offset by 120° around the axis of rotation R and from which the plastic material is injected into the tool mold to form the gear 1 during the production of the gear 1, are provided in the circumferential, concave depression 5. Also clearly visible is the formation of the extension 60 with a circumferential ring 62, from which a plurality of evenly distributed and radially outwardly directed ribs 64 extend radially outward.

Figure 6:
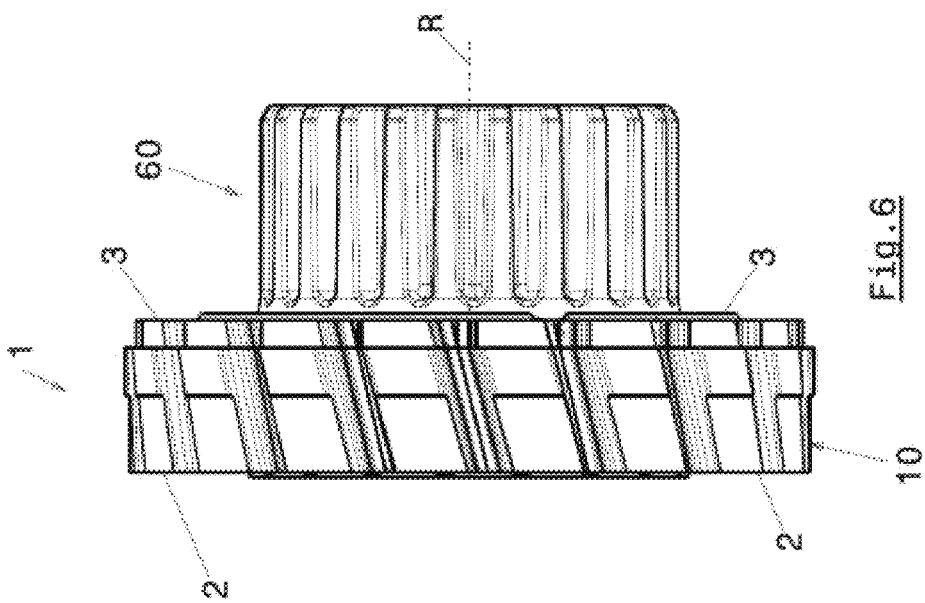
FIG. 6 shows a side view of the gear in FIG. 1 with clearly visible extension.
Figure 5:
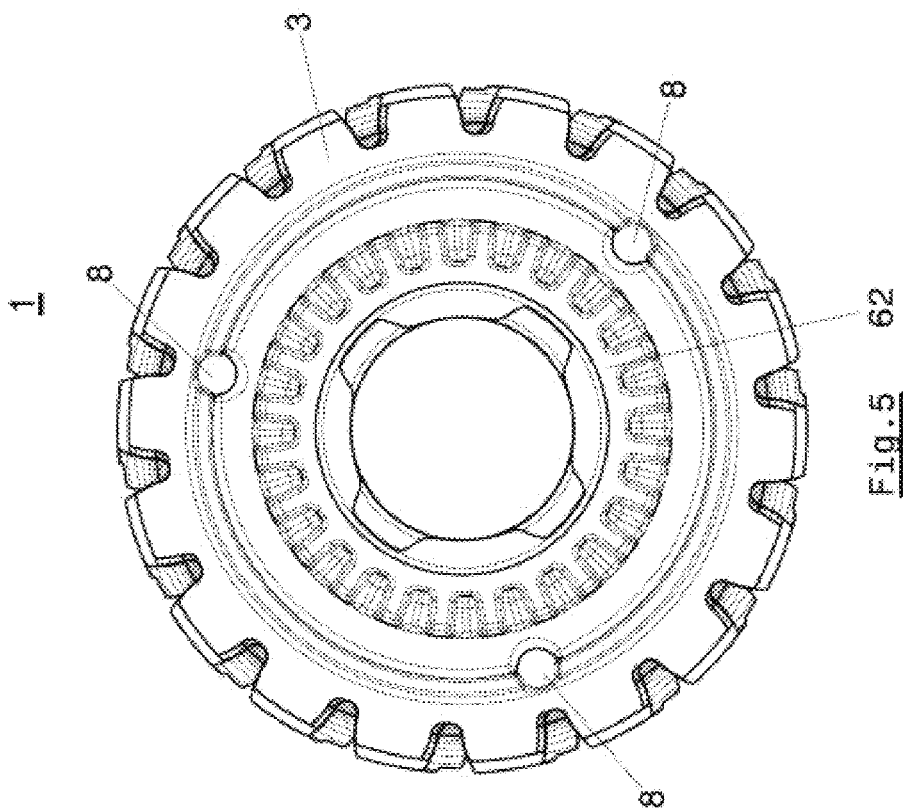
FIG. 5 shows a frontal plan view of the gear in FIG. 1 looking towards the rear end face.

FIG. 5 shows a frontal plan view of the second axial end face 3 of the gear 1. FIG. 6 shows a plan view of the gear in FIG. 5 rotated by 90°.

The following FIGS. 7 to 12 explain with which opening angle V the openings 32, 33 in the gear 1 are to be selected in relation to the axis of rotation R and depending on the helix angle W of the external toothing 10 according to the present invention.

As already explained, FIG. 7 shows the frontal plan view of the first axial end face 2 of the gear 1. FIG. 8 shows the corresponding sectional view A-A along section line A-A of FIG. 7. Said section A-A is tangential to the point on gear 1 where the pitch circle of the gear shown is disposed. The pitch circle of a gear is defined by half the height of a tooth 12 of the corresponding gear 1. The total diameter of the pitch circle is denoted by d0 in FIG. 7. The corresponding radius d0/2 is shown as an arrow in FIG. 7. The section line A-A therefore cuts a tooth gap tangentially between two teeth 12 at half the height of the teeth 12 or the corresponding tooth gap in between. It is precisely at this point that the helix angle W can be found, as shown graphically in FIG. 8. The helix angle W here is approximately 15° and is selected to be counterclockwise to the axis of rotation R. Said helix angle W is also decisive for the oblique arrangement of the openings 32, 33 according to the following formula:

$$V = \arctan\left(\tan(W) \times (R)/(d0/2)\right),$$

where
d0/2=half the pitch diameter of the external toothing 10,
R=distance from the center of one of the openings 32; 33 to the axis of rotation (R).

This will be explained in more detail in connection with FIGS. 9 to 12.

FIG. 9 shows a representation similar to that in FIG. 7, but the section A-A now runs tangentially through the center of one of the outer openings 32. Said center of the opening 32 is at a distance from the center of the axis of rotation R, which is designated by the reference symbol $R_{32}$. The resulting opening angle $V_{32}$ is calculated for the opening 32 as follows:

$$V_{32} = \arctan\left(\tan(W) \times (R_{32}/d0/2)\right),$$

where
W is the helix angle of the external toothing 10 and d0/2 is half the pitch circle diameter of the external toothing 10 and $R_{32}$ is equal to the distance from the center of the opening 32 to the axis of rotation R.

From this specification it can be clearly seen that the angle $V_{32}$ is slightly smaller than the helix angle W for the openings 32.

If the section A-A is placed in the center of an opening 33 disposed further inward, the opening angle $V_{33}$ is calculated as follows:

$$V_{33} = \arctan\left(\tan(W) \times (R_{33}/(d0/2))\right).$$

Since the radius $R_{33}$ is smaller than the previously discussed radius $R_{32}$ and is also smaller than the helix angle W of the external toothing 10, an even smaller opening angle $V_{33}$ results for the opening angle $V_{33}$ of the openings 33 disposed on an inner annulus.

$$V_{33} < V_{32} < W. \qquad 5$$

Figure 11:
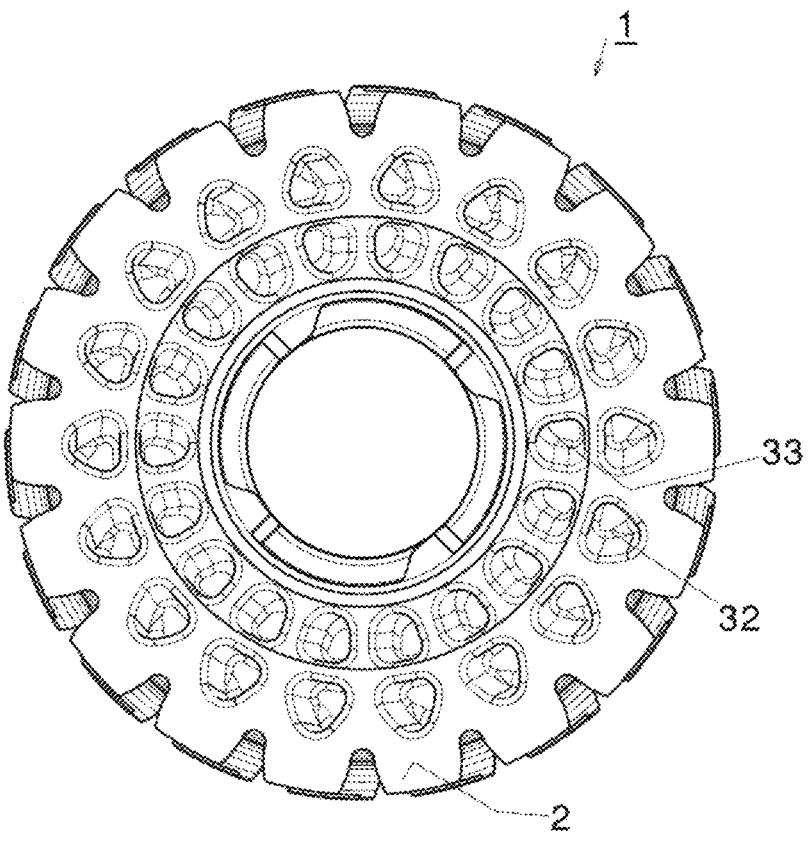
FIG. 11 shows a plan view of a second exemplary embodiment of a gear onto the front end face, similar to the illustration in FIG. 1, wherein the openings arranged on two annuli are placed offset to one another.

Although in the figures explained thus far the openings 32, 33 were arranged radially aligned with each tooth 12 of the external toothing 10, it is also possible to place the openings 33 offset from the openings 32 thereabove. A corresponding view of such an embodiment of the gear 1 is shown in FIG. 11 in a plan view of the first axial end face 2 of a gear 1.

Figure 12:
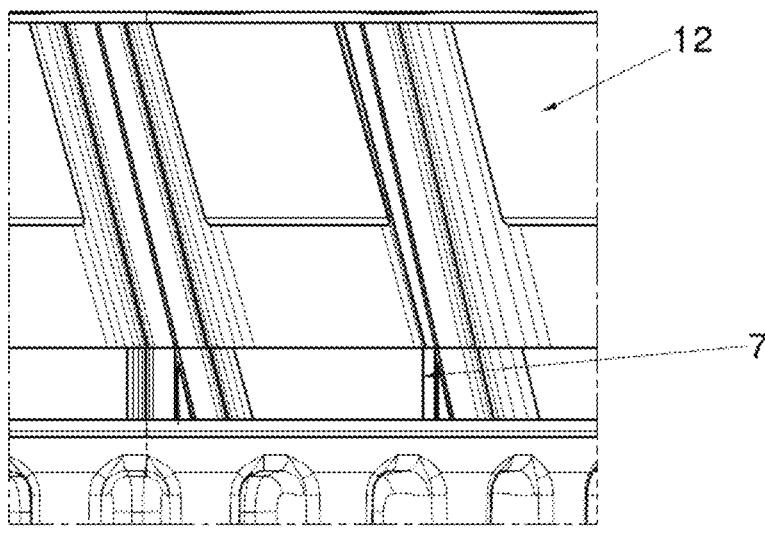
FIG. 12 shows a detailed view of a gear of the external toothing in the region of the tooth flanks.

Finally, FIG. 12 shows a detailed view of the gear of the external toothing 10 in the region of the corresponding tooth flanks.

One tool half has a helix angle. The other side is divided into a side with a helix angle and a side with a vertical angle in order to be able to demold the toothing in a straight manner.

LIST OF REFERENCE NUMERALS

1 Gear
2 First axial end face
3 Second axial end face
5 Concave depression
7 Edge-side toothing section
8 Injection points
10 External toothing
12 Tooth
13 Root circle
30 Intermediate portion
32 Opening
32a Bottom of the opening 32
33 Opening
33a Bottom of the opening 33
34 Reinforcing ribs
35 Reinforcing ribs
37 Reinforcing ring
40 Receiving opening
42 Spindle-nut toothing
60 Extension
62 Ring
D1 Outer diameter of the gear 1
D2 Outer diameter of the extension 60
R Axis of rotation
W Helix angle
V Opening angle
K1 Outer annulus
K2 Inner annulus
a Step region
b Step region
c Step region

The invention claimed is:
1. A gear (1), which is made in one piece out of plastic, comprising:
an axis of rotation (R),
an external toothing (10) arranged about the axis of rotation,
a concentrically arranged receiving opening (40),
an intermediate portion (30) arranged between the external toothing (10) and the receiving opening (40),
a reinforcing structure arranged in the intermediate portion (30) having a plurality of openings (32, 33), and reinforcing ribs (34, 35) disposed between the openings, characterized by the following additional features:
the external toothing (10) is designed as a helical toothing with a helix angle (W) to the axis of rotation (R),
at least some of the openings (32, 33) follow at least approximately the helix angle (W) of the helical toothing with an opening angle (V),
characterized in that the opening angle (V) is smaller than the helix angle (W).

2. The gear (1) according to claim 1,
characterized in that the openings (32, 33) are designed as blind openings.

3. The gear (1) according to claim 1,
characterized in that the openings (32, 33) are arranged in circles arranged in two rows and having different circular diameters (K1, K2) about the axis of rotation (R).

4. The gear (1) according to claim 3,
characterized in that the openings (32, 33) are arranged oriented radially to one another on the two circles.

5. The gear (1) according to claim 3,
characterized in that the openings (32, 33) are arranged radially offset to one another on the two circles.

6. The gear (1) according to claim 1,
characterized in that a reinforcing ring (37) is arranged between the two annularly arranged openings (32, 33).

7. The gear (1) according to claim 1,
characterized in that an opening (32) is arranged under each tooth root of a tooth (12) of the external toothing (10) and that said opening (32) extends at least approximately to a root circle (13) of the respective tooth (12) of the external toothing (10) or projects beyond the root circle (13) into the respective tooth (12).

8. The gear (1) according to claim 1,
characterized in that the openings (32, 33), seen in cross section, have a shape deviating from a circular ring.

9. The gear (1) according to claim 1,
characterized in that spindle-nut toothing (42) is arranged in the receiving opening (40).

10. The gear (1) according to claim 1,
characterized in that the gear (1) has, on one of its axial sides (2, 3), an extension (60) for receiving a radial and axial bearing.

11. The gear (1) according to claim 10,
characterized in that the extension (60) is formed as a circumferential ring (62) having a large number of evenly distributed ribs (64) which are directed radially outward, an outer diameter (D2) of the extension (60) being smaller than an outer diameter (D1) of the external toothing (10).

12. The gear (1) according to claim 10,
characterized in that a circumferential, concave depression (5) is provided between the extension (60) and a facing axial side (3) of the gear (1).

13. The gear (1) according to claim 1,
characterized in that radially outwardly pointing end faces of the teeth (12) of the gear (10), viewed in the axial direction of the gear (1), have a plurality of steps.

14. The gear (1) according to claim 13,
characterized in that the teeth (12) have three step regions (a, b, c), wherein a center step region (b) is at a radially greater distance from the axis of rotation (R) than the outer step regions (a, c).

15. The gear (1) according to claim 1,
characterized in that the teeth (12) of the external toothing (10) have, viewed in the axial direction, an edge-side tooth portion (7) which transitions from the helical toothing having the angle (W) to the spur toothing having the helix angle 0.

16. The gear (1) according to claim 1,
characterized in that the helix angle (W) is greater than 0 and less than about 10° to 20°.

17. The gear (1) according to claim 1,
characterized in that the opening angle (V) is at least approximately formed according to the following formula:

$$V=\arctan(\tan(W)\times(R)/(d0/2)),$$

where
d0/2=half the pitch diameter of the external toothing (10),
R=distance from the center of one of the openings (32; 33) to the axis of rotation (R).

18. A method for producing a gear according to claim 1, in which method a tool mold is provided with an insert for forming the openings (32, 33) and the insert is moved out of the injection-molded gear (32, 33) using equilateral rotation when the gear (1) is demolded from the mold.

19. A gear (1), which is made in one piece out of plastic, comprising:
an axis of rotation (R),
an external toothing (10) arranged about the axis of rotation,
a concentrically arranged receiving opening (40),
an intermediate portion (30) arranged between the external toothing (10) and the receiving opening (40),
a reinforcing structure arranged in the intermediate portion (30) having a plurality of openings (32, 33), and reinforcing ribs (34, 35) disposed between the openings, characterized by the following additional features:
the external toothing (10) is designed as a helical toothing with a helix angle (W) to the axis of rotation (R), at least some of the openings (32, 33) follow at least approximately the helix angle (W) of the helical toothing with an opening angle (V),
characterized in that the teeth (12) of the external toothing (10) have, viewed in the axial direction, an edge-side tooth portion (7) which transitions from the helical toothing having the angle (W) to the spur toothing having the helix angle 0.

20. A gear (1), which is made in one piece out of plastic, comprising:
an axis of rotation (R),
an external toothing (10) arranged about the axis of rotation,
a concentrically arranged receiving opening (40),
an intermediate portion (30) arranged between the external toothing (10) and the receiving opening (40),
a reinforcing structure arranged in the intermediate portion (30) having a plurality of openings (32, 33), and reinforcing ribs (34, 35) disposed between the openings, characterized by the following additional features:
the external toothing (10) is designed as a helical toothing with a helix angle (W) to the axis of rotation (R),
at least some of the openings (32, 33) follow at least approximately the helix angle (W) of the helical toothing with an opening angle (V),
characterized in that the opening angle (V) is at least approximately formed according to the following formula:

$$V=\arctan(\tan(W)\times(R)/(d0/2)),$$

where
d0/2=half the pitch diameter of the external toothing (10),
R=distance from the center of one of the openings (32; 33) to the axis of rotation (R).

\* \* \* \* \*